Oct. 19, 1937.  J. A. DUDLEY  2,096,229
CASTER BRAKE
Filed Aug. 3, 1936
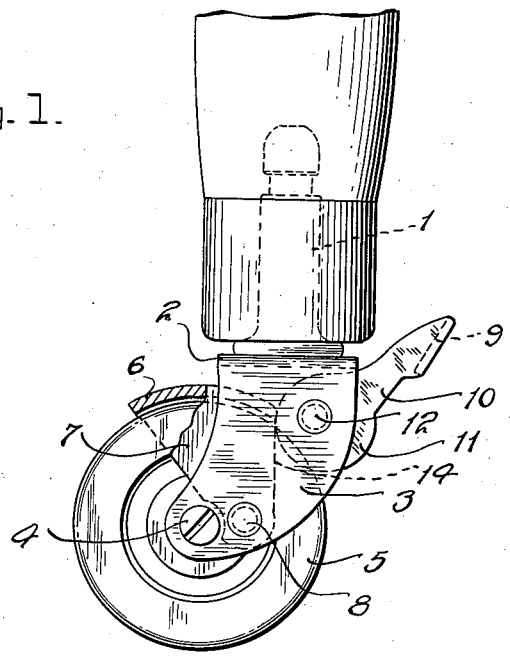
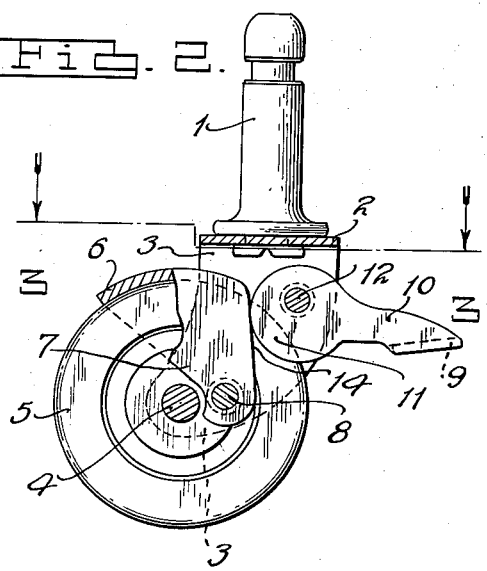
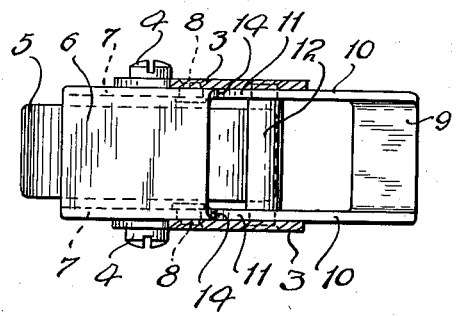
INVENTOR.
JOHN A. DUDLEY.
BY
ATTORNEY.

Patented Oct. 19, 1937

2,096,229

UNITED STATES PATENT OFFICE 2,096,229

CASTER BRAKE

John A. Dudley, Detroit, Mich.

Application August 3, 1936, Serial No. 93,957

5 Claims. (Cl. 16—35)

This invention relates to caster brakes and the object of the invention is to provide a brake for a caster in which the brake shoe is pivoted on an axis eccentric to the axis of the caster wheel.

Another object of the invention is to provide a caster brake in which the brake shoe is pivotally mounted in the caster fork at one side of the axis of the caster wheel and a cam is rotatably mounted in the caster fork and is movable to turn the brake shoe on its pivot into engagement with the caster wheel.

A further object of the invention is to provide a caster brake in which the parts may be stamped from sheet metal and may be used to effectively lock the wheel from rotation.

Another object of the invention is to provide a caster brake including a brake shoe pivotally mounted eccentric to the axis of the caster wheel and a cam engaging the brake shoe at a distance from its axis of rotation, the cam being turnable in one direction to turn the brake shoe on its pivot into engagement with the caster wheel periphery and being turnable in the opposite direction to release the pressure on the brake shoe and allow the caster wheel to rotate.

A further object of the invention is to provide a brake shoe in the form of an inverted U and a cam member formed of a U-shaped stamping, the ends of the cam member engaging the sides of the U-shaped brake shoe to provide cam action on both sides of the brake shoe.

Another object of the invention is to provide a caster brake in which the brake shoe extends over the top of the caster wheel and is arranged so that when the brake is applied the weight of the article supported by the caster is applied in holding the brake shoe against the caster wheel.

A further object of the invention is to provide a caster brake in which the brake shoe when applied has a wrapping action upon rotation of the caster wheel in one direction and a cam prevents turning movement of the brake shoe upon rotation of the caster wheel in the opposite direction.

Another object of the invention is to provide a caster brake in which the brake may be applied or released with the foot.

These objects and the several novel features of the invention are hereinafter more fully described and claimed and the preferred form of construction by which these objects are attained is shown in the accompanying drawing in which—

Fig. 1 is an elevation of a caster and brake embodying my invention and showing the brake in the released position.

Fig. 2 is a section showing the brake applied.

Fig. 3 is a section taken on line 3—3 of Fig. 2.

As shown in Figs. 1 and 2, the caster comprises a spindle 1 which may be inserted into the leg or other portion of any article to be supported on the caster. This spindle 1 is secured to a caster fork 2 and this caster fork 2 is provided with legs 3 having an axle 4 extending between the lower ends thereof as shown in Fig. 2. A caster wheel 5 is rotatably mounted on the axle 4 and extends between the legs 3 of the fork 2. The brake shoe 6 is arcuate in form as shown in Figs. 1 and 2 and is provided with a pair of legs 7 which extend over opposite sides of the caster wheel 5 and are pivotally mounted in the respective fork legs 3 on the pivots 8. These pivots 8 are eccentric to the axis of the caster wheel 5 so that in turning the brake shoe 6 in a counter-clockwise direction on the pivots 8 the brake shoe is rotated into engagement with the periphery of the caster wheel 5 and by turning the brake shoe 6 in a clockwise direction on the pivots 8 the brake shoe is rotated out of engagement with the caster wheel periphery.

The cam member is formed from a sheet metal stamping and comprises a cross member 9 having two legs 10. Each leg 10 terminates in a cam portion 11 and a pivot pin 12 extends through the fork legs 3 and through the cam portions 11 of the cam member and the pin 12 is secured in position in the fork legs 3. These cam portions 11 engage against the respective edges 14 of the brake shoe legs 7 as shown in Figs. 1, 2 and 3.

In the position shown in Fig. 1, the cam member is in the up or released position allowing the brake shoe 6 to remain out of contact with the caster wheel 5 and allowing the caster to be moved about in the usual manner. By stepping down on the upper end of the cam member, the end 9 is depressed from the position shown in Fig. 1 to that shown in Fig. 2. This causes the cam ends 11 to turn the brake shoe 6 in a counter-clockwise direction on the pivots 8 into engagement with the caster wheel and the harder the end of the cam member 9 is depressed the tighter the brake shoe 6 is engaged against the caster wheel periphery. As long as the parts remain in the position shown in Figs. 2 and 3 the caster wheel 5 is held from rotation. To release the brake, it is only necessary to engage the toe beneath the cross member 9 and lift it to the position shown in Fig. 1, at which time, the brake is released and will allow movement of the caster and article it supports freely in any direction. It it is to be particularly noted that the weight of the supported article is carried through the spindle 1 and fork legs 3 and thus when the brake is applied as shown in Fig. 2 the weight is carried through the fork legs 3 and pivots 8 and comes directly onto the brake shoe 6 and through the shoe onto the wheel 5 so that the weight of the article itself assists in applying the brake.

This will be more easily understood from Fig. 2 in which it will be noted that as the cam member is turned in a clockwise direction on its pivot 12 the brake shoe 6 is pressed into tight engagement with the caster wheel 5 thus tending to raise the pivots 8 so that the weight of the article supported by the caster is applied directly through the fork legs 3, pivots 8 and legs 7 to the brake shoe 6 so that in effect the weight of the article supported by the caster comes directly onto the brake shoe 6 and through the brake shoe onto the caster wheel thus firmly holding the caster wheel from rotation.

Another feature of this device that will be understood from Fig. 2 is that counter-clockwise rotation of the caster wheel 5 will produce a wrapping action of the brake shoe 6 and due to the pivots 8 being eccentric to the axle 4 this will increase the binding action of the brake shoe on the caster wheel periphery. At the same time, clockwise rotation of the caster wheel 5 cannot release the brake 6 due to the fact that the cams 11 hold the brake shoe 6 against clockwise rotation.

Another feature of this device is that wear of the parts will not prevent the brake from being applied. This is due to the fact that should the axle 4 wear the caster fork will move downwardly thus bringing the brake shoe 6 closer to the caster wheel. Also, by the shape of the cam ends 11 of the cam member, this cam member may be turned to a greater or less extent to assure proper application of the brake. The caster fork 2 and legs 3 may be formed from a substantially U-shaped metal stamping while the brake shoe 6 and legs 7 may also be formed from a substantially U-shaped metal stamping and the cam member comprising the cross member 9 and legs 10 is also substantially U-shaped in form and may be stamped out.

This results in cheapness of manufacture and, at the same time, the leverage applied by the cam member to the brake shoe is applied on both sides of the brake shoe above its pivot insuring a firm and strong application of the brake in which the pressure is applied evenly to both sides of the brake shoe 6. Another important feature of this invention is that the brake may be applied or released with one foot so that it is not necessary to bend over or get down close to the caster to apply or release the brake.

From the foregoing description it becomes evident that the device is very simple and efficient in operation, is composed of few parts and is of consequent low manufacturing cost, may be readily locked or unlocked by the operator with the use of one foot and provides a device which accomplishes the objects described.

Having thus fully described my invention, its utility and mode of operation, what I claim and desire to secure by Letters Patent of the United States is—

1. In a caster, a fork having a pair of legs, a caster wheel rotatably mounted between the legs of the fork, a brake shoe having a pair of legs extending on opposite sides of the caster wheel, each leg of the brake shoe being pivotally mounted on the inside of the respective leg of the fork eccentric to the axis of the caster wheel, a cam member comprising a transverse portion, a leg extending from each side of said transverse portion, each leg of the cam member being provided with a cam shaped end pivotally connected to the respective leg of the fork and riding in engagement with the respective leg of the brake shoe, the cam member being arranged upon turning movement on its pivot in one direction to turn the brake shoe on its pivot into engagement with the top side of the caster wheel and the transverse portion of the cam member providing an extending pedal for operation of the cam.

2. In a caster, a fork having a pair of legs, a caster wheel rotatably mounted between the ends of the fork legs, a brake shoe having a pair of legs extending on opposite sides of the caster wheel, each leg of the brake shoe being pivotally mounted on the respective leg of the fork eccentric to the axis of the caster wheel, a double cam member pivotally mounted between the legs of the caster fork above the pivot for the brake shoe legs and engaging the brake shoe legs whereby turning movement of the double cam member in one direction will turn the brake shoe on its pivot into engagement with the caster wheel and turning movement of the double cam member in the opposite direction will release the pressure on the brake shoe, the double cam member being provided with an extending pedal portion whereby the double cam member may be turned in either direction.

3. In a caster, a fork having a pair of legs, a caster wheel rotatably mounted between the legs of the fork, a brake shoe having a pair of extending legs, the legs of the brake shoe being pivotally mounted in the legs of the fork at one side of the axis of the caster wheel, a cam member having a pair of legs pivotally mounted between the legs of the fork, each leg of the cam member being provided with a cam shaped end engaging the respective leg of the brake shoe, the arrangement being such that as the cam member is turned on its axis the cams turn the brake shoe on its pivot into engagement with the caster wheel.

4. In a caster, a fork having a pair of legs, a caster wheel rotatably mounted between the legs of the fork, a brake shoe having a pair of legs extending on opposite sides of the caster wheel and pivotally mounted in the legs of the fork adjacent to the axis of the caster wheel, a cam member engaging the brake shoe and turnable in one direction to turn the brake shoe on its pivot into engagement with the caster wheel and turnable in the opposite direction to release the brake shoe.

5. In a caster, a fork having a pair of legs, a caster wheel rotatably mounted between the legs of the fork, a brake shoe extending over the top side of the caster wheel and having a pair of legs extending on opposite sides of the caster wheel and pivotally mounted in the legs of the fork eccentric to the axis of the caster wheel, a cam member engaging the brake shoe and turnable in one direction to turn the brake shoe on its pivot into engagement with the periphery of the caster wheel over its axis, the brake shoe being rotatable with the caster wheel to a limited extent to produce a wrapping action.

JOHN A. DUDLEY.